US012057566B2

(12) United States Patent
Park et al.

(10) Patent No.: US 12,057,566 B2
(45) Date of Patent: Aug. 6, 2024

(54) ELECTRODE FOR LITHIUM SECONDARY BATTERY, METHOD OF PREPARING THE SAME AND LITHIUM SECONDARY BATTERY INCLUDING THE SAME

(71) Applicant: LG Chem, Ltd., Seoul (KR)

(72) Inventors: Sung Chul Park, Daejeon (KR); Ung Ju Lee, Daejeon (KR); Koo Seung Chung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 259 days.

(21) Appl. No.: 16/959,857

(22) PCT Filed: Feb. 1, 2019

(86) PCT No.: PCT/KR2019/001469
§ 371 (c)(1),
(2) Date: Jul. 2, 2020

(87) PCT Pub. No.: WO2019/151833
PCT Pub. Date: Aug. 8, 2019

(65) Prior Publication Data
US 2020/0373558 A1  Nov. 26, 2020

(30) Foreign Application Priority Data

Feb. 1, 2018  (KR) .................. 10-2018-0013008

(51) Int. Cl.
| | | |
|---|---|---|
| *H01M 4/13* | (2010.01) | |
| *H01M 4/139* | (2010.01) | |
| *H01M 4/36* | (2006.01) | |
| *H01M 4/62* | (2006.01) | |
| *H01M 4/66* | (2006.01) | |
| *H01M 10/05* | (2010.01) | |
| *H01M 10/0525* | (2010.01) | |
| *H01M 4/02* | (2006.01) | |

(52) U.S. Cl.
CPC ........... *H01M 4/139* (2013.01); *H01M 4/366* (2013.01); *H01M 4/623* (2013.01); *H01M 4/661* (2013.01); *H01M 10/0525* (2013.01); *H01M 2004/021* (2013.01)

(58) Field of Classification Search
CPC ...... H01M 4/139; H01M 4/366; H01M 4/623; H01M 4/661; H01M 10/0525; H01M 2004/021
See application file for complete search history.

(56) References Cited

U.S. PATENT DOCUMENTS

| | | | | |
|---|---|---|---|---|
| 5,834,052 A | * | 11/1998 | Fukumura ........... | H01M 4/0402 427/420 |
| 2002/0197535 A1 | * | 12/2002 | Dudley ............... | H01M 10/052 427/407.1 |
| 2004/0202928 A1 | | 10/2004 | Miyamoto et al. | |
| 2012/0058375 A1 | | 3/2012 | Tanaka et al. | |
| 2012/0141877 A1 | * | 6/2012 | Choi ..................... | H01M 4/139 429/246 |
| 2013/0048340 A1 | | 2/2013 | Bando et al. | |
| 2014/0255778 A1 | | 9/2014 | Huh et al. | |
| 2015/0079460 A1 | | 3/2015 | Byun et al. | |
| 2015/0147624 A1 | | 5/2015 | Yamafuku et al. | |
| 2016/0043373 A1 | * | 2/2016 | Arishima .............. | H01M 50/46 429/246 |
| 2016/0260978 A1 | | 9/2016 | Fujii | |

FOREIGN PATENT DOCUMENTS

| | | |
|---|---|---|
| CN | 1525591 A | 9/2004 |
| CN | 102386419 A | 3/2012 |
| CN | 102969480 A | 3/2013 |
| CN | 105190952 A | 12/2015 |
| CN | 105706275 A | 6/2016 |
| JP | 2011216403 A | 10/2011 |
| JP | 2017022005 A | 1/2017 |
| JP | 2017157515 A | 9/2017 |
| JP | 2017212097 A | 11/2017 |
| KR | 20130024766 A | 3/2013 |
| KR | 20140112609 A | 9/2014 |
| KR | 20150031724 A | 3/2015 |
| KR | 20150060511 A | 6/2015 |
| KR | 10-1586530 * | 1/2016 ........ H01M 10/4235 |
| KR | 101586530 B1 | 1/2016 |

(Continued)

OTHER PUBLICATIONS

Extended European Search Report for Application No. 19747190.7 dated Dec. 17, 2020, 7 pages.
International Search Report for Application No. PCT/KR2019/001469 mailed May 16, 2019, 2 pages.
Search Report dated Mar. 24, 2022 from Office Action for Chinese Application No. 201980007285.2 issued Mar. 30, 2022. 3 pgs.

(Continued)

*Primary Examiner* — Maria Laios
*Assistant Examiner* — Angela J Martin
(74) *Attorney, Agent, or Firm* — Lerner David LLP

(57) ABSTRACT

The present invention provides an electrode for a lithium secondary battery, the electrode including an electrode current collector, an electrode active material layer formed on the electrode current collector, and an insulating layer formed on the electrode current collector and overlapping the electrode active material layer in a partial region. Here, a thickness of the electrode active material layer in the region in which the electrode active material layer and insulating layer do not overlap is $d_1$, a thickness of the insulating layer in the region in which the electrode active material layer and insulating layer do not overlap is $d_2$, and $d_2/d_1$ is 0.02 to 0.4.

8 Claims, 2 Drawing Sheets

(56) References Cited

FOREIGN PATENT DOCUMENTS

| KR | 20160012591 | * | 2/2016 | ............ H01M 10/04 |
| KR | 101768195 B1 | | 8/2017 | |
| KR | 20170100378 A | | 9/2017 | |
| KR | 10-2017-0139463 | * | 12/2017 | .............. H01M 4/04 |
| KR | 20170139463 A | | 12/2017 | |
| WO | 2013110182 A1 | | 8/2013 | |
| WO | 2014162437 A1 | | 10/2014 | |
| WO | 2015064586 A1 | | 5/2015 | |
| WO | 2017163846 A1 | | 9/2017 | |
| WO | WO 2017-163846 | * | 9/2017 | .......... H01M 4/1391 |

OTHER PUBLICATIONS

Search Report dated May 14, 24 from Office Action for Chinese Application No. 201980007285.2 issued May 16, 2024. 2 pgs.

* cited by examiner

ELECTRODE FOR LITHIUM SECONDARY BATTERY, METHOD OF PREPARING THE SAME AND LITHIUM SECONDARY BATTERY INCLUDING THE SAME

CROSS-REFERENCE TO RELATED APPLICATIONS

This application is a national phase entry under 35 U.S.C. 371 of International Application No. PCT/KR2019/001469, filed on Feb. 1, 2019, published in Korean, which claims priority to and the benefit of Korean Patent Application No. 10-2018-0013008, filed on Feb. 1, 2018, the disclosures of which are incorporated herein by reference in their entireties.

TECHNICAL FIELD

The present invention relates to an electrode for a lithium secondary battery, a method of preparing the same, and a lithium secondary battery including the same.

BACKGROUND ART

According to the increase in the development and demand for mobile devices, the demand for a secondary battery as a power source is rapidly increasing, and therefore many studies on batteries capable of meeting various demands have been conducted.

Typically, in terms of the shape of a battery, there is a high demand for a prismatic battery and a pouch-type battery, which can be applied to a product such as a mobile phone with a small thickness, and in terms of a material, there is a high demand for a lithium secondary battery such as a lithium cobalt polymer battery with a high energy density, a high discharge voltage and high safety.

One of the major research projects on secondary batteries is enhancing safety. The main cause of battery safety-related accidents is caused by occurrence of an abnormal high temperature state due to a short circuit between a positive electrode and a negative electrode. In other words, to maintain electric insulation in a normal situation, a separator is disposed between the positive electrode and the negative electrode, but there is a limitation with only a conventional separator in an abnormal abuse situation in which a battery is overcharged or overdischarged, an internal short circuit occurs due to the dendritic growth of an electrode material or impurities, a sharp object such as a nail or a screw perforates a battery, or the battery is deformed excessively due to an external force.

Generally, a microporous film consisting of a polyolefin resin is mainly used as a separator, but the film has a thermal resistance temperature of about 120 to 160° C., which means that the film has insufficient thermal resistance. Therefore, when an internal short circuit occurs, there is a problem in which a short-circuit part expands by shrinkage of the separator due to short-circuit reaction heat, leading to thermal runaway in which more and higher reaction heat is generated.

In addition, generally, a secondary battery is produced in a prismatic shape by cutting a positive electrode and a negative electrode into a constant size, and overlapping the cut electrodes layer by layer. Here, as there is a very small needle-like sharp part at the edge of the positive electrode or negative electrode coated with a polymer electrolyte, when the electrodes are stacked, this part has a minute internal short circuit, leading to an adverse effect on battery performance. Particularly, since the edge is more irregular than the inside when being coated with a polymer electrolyte, there is a high probability of a short circuit due to non-uniform coating. In addition, when upper and lower electrode layers are perfectly overlapped while the electrodes are stacked, a short circuit between the positive electrode and the negative electrode may occur.

As described above, various methods for reducing cell deformation, an external impact or the probability of a physical short circuit between a positive electrode and a negative electrode have been studied.

For example, to prevent a short circuit in a completed battery caused by the contact of an electrode tab with the upper portion of an electrode assembly due to movement of the electrode assembly, a method of attaching an insulation tape with a predetermined size to an electrode tab adjacent to the upper portion of a current collector is used. As the insulation tape, generally, a polyimide film is used, and it is generally recommended that winding the insulation tape progresses from the upper portion of the current collector to a length slightly extending downward. In addition, to prevent unwinding, generally, the tape was wound about 2 to 3 times.

However, winding of the insulation tape is very complicated, and when the insulation tape is wound from the upper portion of the current collector to a length slightly extending downward, such a portion may cause an increase in the thickness of the electrode assembly. Further, there is a problem that the tape tends to be unwound when the electrode tab is bent.

Korean Unexamined Patent Application Publication No. 10-2015-0031724 discloses a secondary battery.

PRIOR ART LITERATURE

Patent Literature

Korean Unexamined Patent Application Publication No. 10-2015-0031724

DISCLOSURE

Technical Problem

The present invention is directed to providing an electrode for a lithium secondary battery which has excellent insulation between electrodes in a battery assembly and an excellent cohesive strength between an electrode active material layer and an insulating layer, thereby enhancing the quality and stability of a battery.

In addition, the present invention is directed to providing an electrode for a lithium secondary battery which can significantly prevent erosion of occurring at each of an electrode active material layer and an insulating layer in an overlapping region between these layers.

In addition, the present invention is directed to providing a method of preparing an electrode for a lithium secondary battery, which can enhance the insulation between electrodes in battery assembly and a cohesive strength between an electrode active material layer and an insulating layer.

In addition, the present invention is directed to providing a lithium secondary battery including an electrode for a lithium secondary battery.

Technical Solution

The present invention provides an electrode for a lithium secondary battery, the electrode including: an electrode current collector; an electrode active material layer formed on the electrode current collector; and an insulating layer formed on the electrode current collector and overlapping the electrode active material layer in a partial region. Here, a thickness of the electrode active material layer in a region in which the electrode active material layer and insulating layer do not overlap is $d_1$, a thickness of the insulating layer in a region in which the electrode active material layer and insulating layer do not overlap is $d_2$, and $d_2/d_1$ is 0.02 to 0.4.

In addition, the present invention provides a method of preparing the above-described electrode for a lithium secondary battery, the method including: forming an undried electrode active material layer by applying an active material slurry composition on an electrode current collector; forming an undried insulating layer by applying an insulating composition partially overlapping the undried electrode active material layer in a partial region of the electrode current collector; and simultaneously drying the undried electrode active material layer and the undried insulating layer.

In addition, the present invention provides a lithium secondary battery including the above-described electrode for a lithium secondary battery.

Advantageous Effects

An electrode for a lithium secondary battery of the present invention includes an insulating layer having an overlapping region with an electrode active material layer, and by controlling a thickness ratio of the insulating layer, insulation between electrodes is excellent in battery assembly and cohesion between an electrode active material layer and an insulating layer is excellent, thereby enhancing the quality and stability of a battery.

In addition, the electrode for a lithium secondary battery can significantly prevent the erosion of an insulating layer or an electrode active material layer in the above-mentioned overlapping region.

In addition, according to the above-described method of preparing an electrode for a lithium secondary battery of the present invention, for example, the applied undried electrode active material layer and undried insulating layer are simultaneously dried, thereby enhancing the cohesive strength between an electrode active material layer and an insulating layer and processability. As a result, the quality and stability of an electrode for a lithium secondary battery and a lithium secondary battery including the same can be enhanced.

MODES OF THE INVENTION

Figure 1:
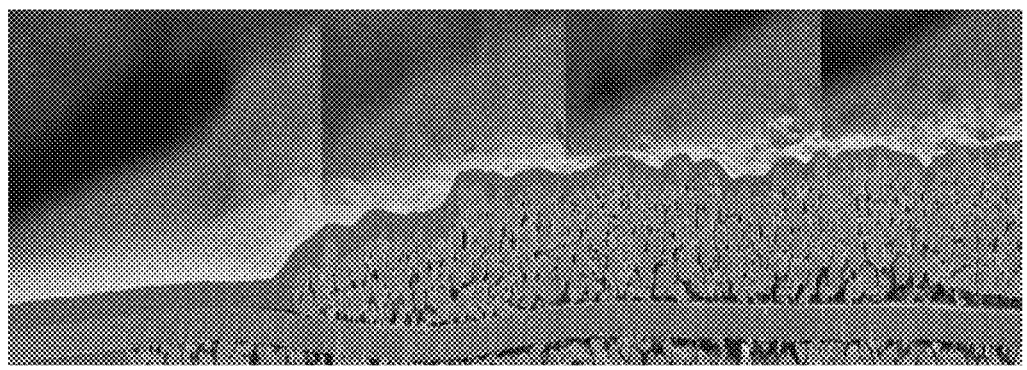
FIG. 1 is a scanning electron microscope (SEM) image showing the region in which an insulating layer and a positive electrode active material layer overlap in the cross-section of a positive electrode prepared in Example 1.

Hereinafter, the present invention will be described in further detail to help understanding of the present invention. Here, terms and words used in the specification and claims should not be construed as limited to general or dictionary meanings, and should be interpreted with the meaning and concept in accordance with the technical idea of the present invention based on the principle that the inventors have appropriately defined the concepts of terms in order to explain the invention in the best way.

The terms used in the specification are used only to explain specific examples, not to limit the present invention. Singular expressions include plural referents unless clearly indicated otherwise in the context.

The terms "include" and "have" used herein designate the presence of characteristics, numbers, stages, components or a combination thereof, and it should be understood that the possibility of the presence or addition of one or more other characteristics, numbers, stages, components, or a combination thereof is not excluded in advance.

The "%" used herein means a weight percent (wt %) unless explicitly indicated otherwise.

In the specification, the average particle size ($D_{50}$) may be defined as a particle size corresponding to 50% in a cumulative volume-based particle size distribution curve. The average particle size ($D_{50}$) may be measured using a laser diffraction method. The laser diffraction method generally enables measurement of a particle size in a range from submicrons to several mm, and may obtain a result with high reproducibility and high resolution.

Hereinafter, the present invention will be described in detail.

Electrode for Lithium Secondary Battery

The present invention provides an electrode for a lithium secondary battery, which includes an electrode current collector; an electrode active material layer formed on the electrode current collector; and an insulating layer formed on the electrode current collector and overlapping the electrode active material layer in a partial region. Here, when the thickness of the electrode active material layer in a region in which the electrode active material layer and insulating layer do not overlap is $d_1$, and the thickness of the insulating layer in a region in which the electrode active material layer and insulating layer do not overlap is $d_2$, $d_2/d_1$ is 0.02 to 0.4.

The electrode for a lithium secondary battery includes an insulating layer having an overlapping region with an electrode active material layer, and by controlling the thickness of the insulating layer in a specific ratio, the electrode may have enhanced cohesion between the insulating layer and the electrode active material layer, and sufficient insulation. In addition, as the electrode active material layer and the insulating layer are overlapped, the exposure of the electrode current collector may be minimized, thereby preventing a short circuit occurring when there is a problem in the shrinkage of a separator, for example, a positive electrode makes contact with a negative electrode, and enhancing the quality and stability of a battery.

The electrode for a lithium secondary battery includes an electrode current collector, an electrode active material layer and an insulating layer.

The electrode current collector is not particularly limited as long as it has high conductivity without causing a chemical change in a battery, and may be, for example, copper, stainless steel, aluminum, nickel, titanium, calcined carbon, copper or stainless steel whose surface is treated with carbon, nickel, titanium or silver, or an aluminumcadmium alloy. In addition, the electrode current collector may generally have a thickness of 3 to 500 μm, and fine irregularities may be formed on the surface of the current collector, thereby reinforcing the binding strength with an electrode active material. For example, the electrode current collector may be used in various forms such as a film, a sheet, a foil, a net, a porous body, a foamed body, a non-woven fabric, etc.

The electrode active material layer is formed on the electrode current collector.

The electrode active material layer may include an electrode active material.

The electrode active material may include a positive electrode active material or a negative electrode active material. Preferably, the electrode active material includes a positive electrode active material.

The positive electrode active material is not particularly limited, and may be, for example, a generally used positive electrode active material. Specifically, the positive electrode active material may be a layered compound such as lithium cobalt oxide ($LiCoO_2$) or lithium nickel oxide ($LiNiO_2$) or a compound substituted with one or more transition metals; lithium iron oxide such as $LiFe_3O_4$; a lithium manganese oxide represented by $Li_{1+c1}Mn_{2-c1}O_4$ ($0 \leq c1 \leq 0.33$), such as $LiMnO_3$, $LiMn_2O_3$, or $LiMnO_2$; lithium copper oxide ($Li_2CuO_2$); a vanadium oxide such as $LiV_3O_8$, $V_2O_5$, or $Cu_2V_2O_7$; an Ni-site lithium nickel oxide represented by $Li_{1-c2}M_{c2}O_2$ (wherein M is at least any one selected from the group consisting of Co, Mn, Al, Cu, Fe, Mg, B and Ga, and $0.01 \leq c2 \leq 0.3$); a lithium manganese composite oxide represented by $LiMn_{2-c3}M_{c3}O_2$ (wherein M is at least any one selected from the group consisting of Co, Ni, Fe, Cr, Zn and Ta, and $0.01 \leq c3 \leq 0.1$) or $Li_2Mn_3MO_8$ (wherein M is at least any one selected from the group consisting of Fe, Co, Ni, Cu and Zn); or $LiMn_2O_4$ in which a part of Li of a formula is substituted with an alkaline earth metal ion, but the present invention is not limited thereto. The positive electrode may be a Li-metal.

The negative electrode active material is not particularly limited, and may be, for example, a compound enabling reversible intercalation and deintercalation of lithium. A specific example of the negative electrode active material may be a carbon-based material such as artificial graphite, natural graphite, graphitized carbon fiber or amorphous carbon; a metallic compound enabling alloying with lithium, such as Si, Al, Sn, Pb, Zn, Bi, In, Mg, Ga, Cd, a Si alloy, a Sn alloy or an Al alloy; a metal oxide capable of doping and undoping lithium such as $SiO_\beta$ ($0<\beta<2$), $SnO_2$, vanadium oxide, or lithium vanadium oxide; or a composite including the metallic compound and the carbon-based material such as a Si—C composite or a Sn—C composite, and any one or a mixture of two or more thereof may be used. In addition, as the negative electrode active material, a metal lithium thin film may be used. In addition, as a carbon material, both low-crystalline carbon and high-crystalline carbon may be used. Representative examples of the low-crystalline carbon include soft carbon and hard carbon, and representative examples of the high-crystalline carbon include amorphous, sheet-type, flake-type, spherical or fiber-type natural or artificial graphite, Kish graphite, pyrolytic carbon, mesophase pitch-based carbon fiber, meso-carbon microbeads, mesophase pitches, and high temperature calcined carbon such as petroleum or coal tar pitch derived cokes.

The electrode active material may be included at 80 to 99.5 wt %, and preferably, 88 to 99 wt %, with respect to the total weight of the electrode active material layer.

The electrode active material layer may further include a binder for an electrode active material layer.

The binder may serve to enhance the cohesion between electrode active materials and an adhesive strength between an electrode active material and an electrode current collector.

The binder for an electrode active material layer may serve to enhance the attachment between electrode active materials and an adhesive strength between an electrode active material and an electrode current collector.

Specifically, the binder for an electrode active material layer may be at least one selected from the group consisting of polyvinylidene fluoride, polyvinyl alcohol, styrene butadiene rubber, polyethylene oxide, carboxyl methyl cellulose, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, polymethylmethacrylate, polybutylacrylate, polyacrylonitrile, polyvinylpyrrolidone, polyvinylacetate, polyethylene-co-vinyl acetate, polyarylate and a low molecular weight compound having a molecular weight of 10,000 g/mol or less, and most preferably, polyvinylidene fluoride in terms of adhesiveness, chemical resistance and electrochemical stability.

The binder for an electrode active material layer may be included at 0.1 to 10 wt %, and preferably 0.5 to 5 wt %, with respect to the total weight of the electrode active material layer.

The electrode active material layer may further include a conductive material in addition to the above-described components. The conductive material is not particularly limited as long as it has conductivity without causing a chemical change in a battery, and for example, graphite such as natural graphite or artificial graphite; carbon black such as acetylene black, Ketjen black, channel black, furnace black, lamp black or thermal black; a conductive fiber such as a carbon fiber or a metal fiber; a conductive tube such as a carbon nanotube; a metal powder such as fluorocarbon powder, aluminum powder or nickel powder; a conductive whisker consisting of zinc oxide or potassium titanate; a conductive metal oxide such as titanium oxide; or a conductive polymer such as a polyphenylene derivative may be used.

The conductive material may be included at 0.1 to 20 wt %, and preferably 0.3 to 10 wt %, with respect to the total weight of the electrode active material layer.

The insulating layer is formed on an electrode current collector to overlap the electrode active material layer in a partial region. For example, the electrode active material layer and the insulating layer may be stacked or formed to overlap each other in a partial region.

The insulating layer may be formed of a composition for forming an insulating layer for a lithium secondary battery, which includes a binder for an insulating layer and a solvent.

The binder for an insulating layer is a component for imparting, for example, a binding ability with an electrode current collector and/or an electrode active material layer to an insulating layer.

Specifically, the binder for an insulating layer may be at least one binder polymer selected from the group consisting of polyvinylidene fluoride, polyvinyl alcohol, styrene butadiene rubber, polyethylene oxide, carboxyl methyl cellulose, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, polymethylmethacrylate, polybutylacrylate, polyacrylonitrile, polyvinylpyrrolidone, polyvinylacetate, polyethylene-co-vinyl acetate, polyarylate and a low molecular weight compound having a molecular weight of 10,000 g/mol or less. Among these, the binder polymer is preferably polyvinylidene fluoride in terms of adhesiveness, chemical resistance and electrochemical stability.

The polyvinylidene fluoride polymer may have a weight average molecular weight of 400,000 to 1,500,000, and preferably 600,000 to 1,200,000 in terms of enhancing adhesive strength to the above described electrode active material layer and achieving a desired viscosity.

The polyvinylidene fluoride polymer may have a melting point of 150 to 180° C., and preferably 165 to 175° C. in terms of enhancing the solubility of the composition.

The binder for an insulating layer may be the same material as the above-described binder for an electrode active material layer. In this case, as will be described below, a binding strength in the overlapping region of an electrode active material layer and an insulating layer may be further enhanced, the enhancement of product safety and quality may be expected, and the binder for an electrode active material layer is preferable in terms of enhancement of an adhesive strength, a cohesive strength, and processability such as weldability.

The solvent may be suitably selected in consideration of the solubility and viscosity of the binder for an insulating layer or a coloring agent, and for example, methylpyrrolidone (NMP).

The insulating layer may further include at least one coloring agent selected from the group consisting of an organic dye, an oil-soluble dye and an organic phosphor. The coloring agent may be included in the insulating layer to determine a formation or alignment position of the insulating layer using a detector.

Since the coloring agent including the organic dye, oil-soluble dye and/or organic phosphor, compared with a pigment insoluble in an organic solvent, has excellent solubility in a solvent, when used, the dye or phosphors may be uniformly distributed in an insulating layer. The composition for forming an insulating layer, compared with that using a pigment as a coloring agent, may be significantly reduced in coagulation of the coloring agent, and phase separation, a decrease in liquid stability, and erosion in the overlapping region of the electrode active material layer and the insulating layer when a dispersing agent is used to prevent the coagulation of the pigment may be considerably decreased.

The organic dye may be at least one selected from the group consisting of an anthraquinone-based dye, an anilino azo-based dye, a triphenylmethane-based dye, a pyrazole azo-based dye, a pyridone azo-based dye, an atrapyridone-based dye, an oxonol-based dye, a benzylidene dye, and a xanthene dye, preferably, at least one selected from the group consisting of a benzylidene dye and an azo-based dye, and more preferably, a benzylidene dye so as to enhance liquid stability and an effect of preventing phase separation.

As the organic phosphor, for example, an organic phosphor having a carboxyl group, a phosphate group or both may be used.

The oil-soluble dye may be a benzimidazolone-based compound, an azo-based compound, a quinophthalone-based compound, a quinacridone-based compound, a phthalocyanine-based compound, a diketo-pyrrolo-pyrrole (DPP)-based compound or a combination of two or more thereof, and preferably, a benzimidazolone-based compound, an azo-based compound or a combination of two or more thereof so as to enhance a recognition property.

The coloring agent may further include a metal ion in addition to the organic dye, the oil-soluble dye and/or the organic phosphor. Specifically, the coloring agent may include an organic dye, an oil-soluble dye and/or an organic phosphor, which form(s) a complex salt structure with a metal ion. Since the organic dye, the oil-soluble dye and/or the organic phosphor form(s) a complex salt structure with the metal ion, excellent solubility or dispersibility in an organic solvent and excellent light resistance and stability and thermal resistance may be exhibited, clearness may be further enhanced, and uniform distribution in the composition may be realized.

The metal ion is not particularly limited as long as it can form a complex salt structure with the above-described organic dye, the oil-soluble dye and/or the organic phosphor, and may include, for example, copper, cobalt, chromium, nickel and/or iron ion(s), and preferably a chromium ion.

In the region in which the electrode active material layer and the insulating layer overlap, the electrode active material layer may be formed obliquely.

A length of the region in which the electrode active material layer and the insulating layer overlap may be 0.05 to 1.3 mm, and preferably 0.1 to 1.0 mm. In this case, the above range is preferable for minimizing the reduction in capacity due to overlapping of the electrode active material layer and the insulating layer, and further enhancing the cohesive strength or adhesive strength between the electrode active material layer and the insulating layer.

To prevent the reduction in capacity due to the overlapping of the electrode active material layer and the insulating layer, the thickness of the insulating layer in the region overlapping the electrode active material layer may be reduced more and more toward the electrode active material layer.

In the region in which the electrode active material layer and the insulating layer overlap, when a thickness of the insulating layer at the end of the electrode active material layer is $A_0$, and a thickness of the insulating layer at the end of the insulating layer is A, $A/A_0$ may be 0.05 to less than 1, preferably 0.1 to 0.7, and more preferably 0.2 to 0.4. Within the above-mentioned range, the reduction in capacity due to the overlapping of the electrode active material layer and the insulating layer may be minimized, the cohesive strength or adhesive strength between the insulating layer and the electrode active material layer may be further enhanced, and breakage at the interface due to the erosion between the insulating layer and the active material layer may be prevented.

$A_0$ may be 3 to 20 μm, and preferably 5 to 12 μm, and A may be 0.15 μm to less than 20 μm, and preferably 1 to 5 μm.

In terms of the electrode active material layer or the insulating layer in a region in which the electrode active material layer and insulating layer do not overlap, for example, the region excluding the overlapping region, when the thickness of the electrode active material layer in the region in which the electrode active material layer and insulating layer do not overlap is $d_1$, and the thickness of the insulating layer in the region in which the electrode active material layer and insulating layer do not overlap is $d_2$, $d_2/d_1$ may be 0.02 to 0.4, and preferably 0.05 to 0.1.

The electrode for a lithium secondary battery may have excellent insulation and an excellent adhesive strength due to the above-described range of the thickness ratio of the electrode active material layer and the insulating layer, have no welding interference by an insulating layer in the production of a lithium secondary battery through stacking of a plurality of electrodes, and ensure the minimum thickness for an insulating layer to maintain insulation, thereby enhancing the quality and stability of a battery. When $d_2/d_1$ is less than 0.02, the sufficient insulation of the insulating layer may not be ensured, and there is a concern about a defective product or a decrease in battery capacity, which is caused by erosion occurring in the electrode active material layer. When $d_2/d_1$ is more than 0.4, the thickness of an insulating layer may excessively increase, welding interference may be caused by the insulating layer in stacking of a plurality of electrodes, resulting in a short circuit in a welded part, and therefore a decrease in capacity or an increase in resistance may occur.

In the region in which the electrode active material layer and insulating layer do not overlap, the thickness of the insulating layer ($d_2$) may be 3 to 20 μm, and in the region in which the electrode active material layer and insulating layer do not overlap, the thickness of the electrode active material layer ($d_1$) may be 50 to 150 μm. Within the above ranges, the above-mentioned insulation, adhesiveness and processability may be more excellently realized.

The electrode for a lithium secondary battery may be a positive electrode for a lithium secondary battery or a negative electrode for a lithium secondary battery, and preferably a positive electrode for a lithium secondary battery.

The above-described electrode for a lithium secondary battery may include an insulating layer formed to overlap an electrode active material layer in a partial region, and as the thickness of the insulating layer is controlled in a specific ratio, a cohesive strength between the insulating layer and the electrode active material layer may be enhanced, and a sufficient insulation may be exhibited. In addition, a problem of reducing capacity or increasing resistance due to the short circuit of the battery, which may occur when a plurality of electrodes for lithium secondary battery are stacked may be prevented, and battery quality and stability may be enhanced.

Method of Preparing Electrode for Lithium Secondary Battery

In addition, the present invention provides a method of preparing the above-described electrode for a lithium secondary battery.

The method of preparing an electrode for a lithium secondary battery includes forming an undried electrode active material layer by applying an active material slurry composition on an electrode current collector, forming an undried insulating layer by applying a composition for forming an insulating layer so as to overlap the undried electrode active material layer in a partial region, and simultaneously drying the undried electrode active material layer and the undried insulating layer.

Specifically, the method of preparing an electrode for a lithium secondary battery of the present invention may be a wet-on-wet coating method. For example, the wet-on-wet coating method is a method of forming an undried electrode active material layer by applying an active material slurry composition on an electrode current collector but not drying the slurry composition, forming an undried insulating layer by applying the composition for forming an insulating layer to partially overlap the undried electrode active material layer, and simultaneously drying the undried electrode active material layer and the undried insulating layer. When an electrode active material layer and an insulating layer are formed using the above-described wet-on-wet coating method, compared with when an insulating layer is formed on a dried electrode active material layer, the cohesive strength between the electrode active material layer and the insulating layer is increased. In addition, since only one drying process in included in this method, the preparation process is simple, and the overlapping region is controlled to have a desired length under process conditions, thereby enhancing cohesive strength, weldability and processability, and accordingly, defects in a lithium secondary battery produced as described method may be prevented. As a result, the lithium secondary battery may have excellent quality and stability.

Hereinafter, the method of preparing an electrode for a lithium secondary battery will be described in detail.

First, an undried electrode active material layer is formed by applying an active material slurry composition on an electrode current collector.

The electrode current collector may be the same as the above-described electrode current collector in terms of a type, a material and a thickness thereof.

The active material slurry composition may be applied on the electrode current collector, thereby forming the undried electrode active material layer. The active material slurry composition may be a positive electrode active material slurry composition or a negative active material slurry composition, and the positive electrode active material slurry composition may include a positive electrode active material, a binder for an electrode active material layer and/or a conductive material, and the negative electrode active material slurry composition may include a negative electrode active material, a binder for an electrode active material layer and/or a conductive material. The positive electrode active material, the negative electrode active material, a binder and/or a conductive material may be the above-described positive electrode active material, negative electrode active material, binder for an electrode active material layer and/or conductive material.

The active material slurry composition may further include a solvent in addition to the above-described components, and for example, the solvent may be NMP in consideration of the solubility and viscosity of the active material slurry composition.

The active material slurry composition may have a viscosity of 5,000 to 15,000 cP, and preferably 6,000 to 13,000 cP at 25° C., and within this range, the cohesive strength of the undried electrode active material layer or electrode active material layer may be enhanced, and coatability and processability may be further enhanced.

The active material slurry composition may be applied to the electrode current collector, thereby forming an undried electrode active material layer. The "undried" used herein encompasses the case in which the active material slurry composition is applied and not dried, and the case in which the active material slurry composition is not substantially dried and a drying process is not performed.

Subsequently, an undried insulating layer is formed by applying a composition for forming an insulating layer for a lithium secondary battery to overlap the undried electrode active material layer in a partial region.

Meanwhile, the composition for forming an insulating layer may include the above-described binder for an insulating layer and a solvent, and when needed, further include the above-described coloring agent.

The binder for an insulating layer may be included at 5 to 15 parts by weight, and preferably 8 to 12 parts by weight, with respect to 100 parts by weight of the solvent in terms of realizing a desired viscosity and ease of coating.

The coloring agent may be included in the composition so as to determine an insulating layer-formed position using a detector while the insulating layer is coated using the composition for forming an insulating layer.

The coloring agent may include the above-described organic dye, oil-soluble dye and/or organic phosphor.

The conventional composition for forming an insulating layer generally used a pigment such as an organic pigment or an inorganic pigment. However, generally, a pigment such as an inorganic pigment or an organic pigment is insoluble in water or an organic solvent and easily coagulated in the composition, and thus it is difficult to uniformly distribute the pigment in the insulating layer. To prevent such a pigment coagulation problem, a dispersing agent may be added to the composition for forming an insulating layer. However, to perform a process of overlapping the electrode active material layer and the insulating layer, the composition for forming an insulating layer requires a certain level or more of viscosity, and the composition having a viscosity satisfying such a requirement may have problems of difficulty in pigment dispersion and the possibility of coagulation despite the addition of a dispersing agent.

However, when a coloring agent including an organic dye, an oil-soluble dye and/or an organic phosphor is used, even in the composition for forming an insulating layer with the high viscosity requirement, the coloring agent has excellent solubility in a solvent and is enhanced in liquid stability, thereby exhibiting excellent coatability of the composition for forming an insulating layer, and preventing the erosion of an electrode active material layer in the formation of an insulating layer.

The coloring agent may be included at 0.01 to 10 parts by weight, preferably 0.01 to 1 part by weight, and more preferably 0.05 to 0.5 part by weight, with respect to 100 parts by weight of the solvent, and when the coloring agent is used in the above-mentioned range, it is preferable in terms of ensuring visibility is ensured when an insulating layer formation position is determined using a detector, and the coloring agent is uniformly distributed in the insulating layer.

The solubility of the coloring agent in the solvent may be 300 to 500 g/L, and preferably 350 to 450 g/L at 25° C., and the above-mentioned range is preferable in terms of uniform distribution and enhanced solubility of the coloring agent.

The solvent may be suitably selected in consideration of the solubility and a viscosity of the binder or coloring agent for an insulating layer, and may be, for example, NMP.

A solid content of the composition for forming an insulating layer for a lithium secondary battery may be 5 to 15 wt %, and preferably 8 to 12 wt %. The above-mentioned range is preferable in terms of ensuring desired coatability and a viscosity range.

The composition for forming an insulating layer may have a viscosity of 1,000 to 10,000 cP, and preferably 5,000 to 8,000 cP at 25° C. Within the above range, a viscosity difference from the electrode active material layer may be minimized, and erosion of the electrode active material layer, which may be caused by a low viscosity of the composition for forming an insulating layer, may be effectively prevented.

The viscosity difference at 25° C. between the active material slurry composition and the composition for forming an insulating layer may be 5,000 cP or less, preferably, 2,000 cP or less, and more preferably, 1,000 cP or less. When the viscosity difference is within the above-mentioned range, the adhesive strength or cohesive strength between the undried electrode active material layer and the undried insulating layer after drying may be further enhanced, and the erosion in the overlapping region may be effectively prevented.

When the undried electrode active material layer and the undried insulating layer are formed according to the above-described process, the undried electrode active material layer and the undried insulating layer are simultaneously dried.

In the method of preparing an electrode for a lithium secondary battery according to the present invention, rather than forming an electrode active material layer by applying and drying an active material slurry composition and then applying the composition for forming an insulating layer, the undried electrode active material layer and the undried insulating layer may be simultaneously dried, thereby further enhancing the cohesive strength or adhesive strength between an electrode active material layer and an insulating layer. In addition, for this reason, an overlapping region of the undried electrode active material layer and the undried insulating layer or a region in which the electrode active material layer and the insulating layer overlap becomes relatively longer, and the insulating layer in the overlapping region may be formed to have a small thickness, thereby significantly enhancing processability, easy weldability, and the quality and stability of a battery.

The drying process has no particular limitation, as long as the undried electrode active material layer and the undried insulating layer may be sufficiently dried, and a drying method conventionally known in the art may be used. For example, a drying method selected from a convection method, a direct heating method, and an induction heating method may be applied, and specifically, performed at 50 to 180° C. for 1 to 5 minutes.

Secondary Battery

In addition, the present invention provides a lithium secondary battery including the above-described electrode for a lithium secondary battery.

Specifically, the lithium secondary battery includes a positive electrode, a negative electrode located to face the positive electrode, a separator interposed between the positive electrode and the negative electrode, and an electrolyte. Here, as the positive electrode and/or the negative electrode, the above-described electrode(s) for a lithium secondary battery may be used. In addition, the lithium secondary battery may selectively include a battery case accommodating an electrode assembly including the positive electrode, the negative electrode and the separator, and a sealing member for sealing the battery case.

Meanwhile, in the lithium secondary battery, a separator is not particularly limited as long as it is generally used in a lithium secondary battery to separate a negative electrode from a positive electrode and provide a moving path for lithium ions, and particularly, the separator has a low resistance to ion mobility of an electrolyte and an excellent ability to be saturated in an electrolyte solution. Specifically, a porous polymer film, for example, a porous polymer film prepared of a polyolefin-based polymer such as an ethylene polymer, a propylene polymer, an ethylene/butene copolymer, an ethylene/hexene copolymer and an ethylene/methacrylate copolymer, or a stacked structure including two or more layers thereof may be used. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength, and may be selectively used in a single- or multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, or a melt-type inorganic electrolyte, which can be used in production of a lithium secondary battery, but the present invention is not limited thereto.

Specifically, the electrolyte may include an organic solvent and a lithium salt.

The organic solvent is not particularly limited as long as it can serve as a medium enabling the mobility of ions involved in an electrochemical reaction of a battery. Specifically, the organic solvent may be an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R—CN (R is a linear, branched or cyclic C2 to C20 hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent is preferably used, and a mixture of a cyclic carbonate having high ion conductivity and high permittivity to increase the charge/discharge performance of a battery (for example, ethylene carbonate or propylene carbonate) and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of about 1:1 to about 1:9, the electrolyte solution may exhibit excellent performance.

The lithium salt is not particularly limited as long as it is a compound capable of providing a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$. The concentration of the lithium salt is preferably in the range of 0.1 to 2.0M. When the concentration of the lithium salt is included in the above-mentioned range, the electrolyte has suitable conductivity and viscosity and thus can exhibit excellent electrolytic performance. Therefore, lithium ions can effectively migrate.

To enhance a lifespan characteristic of the battery, inhibit a decrease in battery capacity, and enhance discharge capacity of the battery, the electrolyte may further include one or more types of additives, for example, a haloalkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte. Here, the additive(s) may be included at 0.1 to 5 wt % with respect to the total weight of the electrolyte.

The lithium secondary batteries according to examples are useful in portable devices such as a mobile phone, a notebook computer and a digital camera and in the field of electric automobiles such as a hybrid electric vehicle (HEV).

Therefore, according to another exemplary embodiment of the present invention, a battery module including the lithium secondary battery as a unit cell, and a battery pack including the same are provided.

The battery module or the battery pack may be used as a power source of any one or more medium-to-large devices including a power tool; an electric motor vehicle such as an electric vehicle (EV), a hybrid electric vehicle, and a plug-in hybrid electric vehicle (PHEV); and a power storage system.

The shape of the lithium secondary battery according to the present invention is not particularly limited, but may be a cylindrical shape using a can, a prismatic shape, a pouch shape, or a coin shape.

The lithium secondary battery according to the present invention may not only be used in a battery cell used as a power source of a small device, but also may be preferably used as a unit battery in middle-to-large battery modules including a plurality of battery cells.

Hereinafter, embodiments of the present invention will be described in detail with reference to the accompanying drawings so that those of ordinary skill in the art can easily carry out the present invention. However, the present invention may be implemented in a variety of different forms, and is not limited to the embodiments described herein.

EXAMPLES AND COMPARATIVE EXAMPLES

Example 1

Preparation of Positive Electrode for Lithium Secondary Battery

A positive electrode active material slurry composition having a viscosity of 8,000 cP at 25° C. was prepared by mixing $LiNi_{0.6}Mn_{0.2}Co_{0.2}O_2$ as a positive electrode active material, carbon black as a conductive material, PVdF (trade name: KF9700, manufacturer: Kureha, weight average molecular weight: 880,000) as a binder for an electrode active material layer in a weight ratio of 97.3:1.5:1.2, and adding the mixture to an NMP solvent so that a solid content became 69 wt %.

A composition for forming an insulating layer was prepared by dissolving 9 parts by weight of PVdF (trade name: KF9700, manufacturer: Kureha, weight average molecular weight: 880,000) as a binder for an insulating layer and 0.1 part by weight of a benzylidene dye, Yellow 081 (manufactured by BASF), as an organic dye in 100 parts by weight of NMP. Here, the viscosity of the composition for forming an insulating layer was 6,000 cP.

Afterward, an undried positive electrode active material layer having a thickness of 165 μm was formed by applying the positive electrode active material slurry composition on an aluminum current collector, and an undried insulating layer having a thickness of 15 μm was formed by applying the composition for forming an insulating layer on the aluminum current collector to overlap the undried positive electrode active material layer in a partial region.

Afterward, a positive electrode for a lithium secondary battery (size: 132 mm×104 mm) was prepared by forming a positive electrode active material layer and an insulating layer by simultaneously drying the undried positive electrode active material layer and the undried insulating layer at 160° C. (for about 3 minutes), respectively, and rolling the formed positive electrode active material layer and insulating layer.

In the positive electrode for a lithium secondary battery of Example 1, in a region in which the positive electrode active material layer did not overlap the insulating layer, the thickness of the positive electrode active material layer was 80 μm and the thickness of the insulating layer was 7 μm, the length of the overlapping region was 0.5 mm, A was 2.1 μm, and $A_0$ was 7 μm.

In Example 1, a ratio ($d_2/d_1$) of the thickness ($d_2$) of the insulating layer in the region in which the electrode active material layer and the insulating layer do not overlap to the thickness ($d_1$) of the electrode active material layer in the region in which the electrode active material layer and the insulating layer do not overlap was about 0.088, and in a region in which the electrode active material layer and insulating layer overlap, $A/A_0$ was 0.3.

Example 2

Preparation of Positive Electrode for Lithium Secondary Battery

A positive electrode for a lithium secondary battery (size: 132 mm×104 mm) was prepared in the same manner as described in Example 1, except that the composition for forming an insulating layer was applied with a flow rate about 50% lower than that of Example 1.

In the positive electrode for a lithium secondary battery prepared in Example 2, the thickness of the positive electrode active material layer was 80 μm and the thickness of the insulating layer was 3 μm in the region in which the positive electrode active material layer did not overlap the insulating layer, the length of the overlapping region was 0.5 mm, A was 0.5 μm, and $A_0$ was 3 μm.

In Example 2, a ratio ($d_2/d_1$) of the thickness ($d_2$) of the insulating layer in the region in which the electrode active material layer did not overlap the insulating layer to the thickness ($d_1$) of the electrode active material layer in the region in which the electrode active material layer did not overlap the insulating layer was about 0.038, and in the region in which the electrode active material layer and insulating layer overlap, $A/A_0$ was about 0.17.

Comparative Example 1

Preparation of Positive Electrode for Lithium Secondary Battery

A positive electrode active material slurry composition having a viscosity of 8,000 cP at 25° C. was prepared by mixing $LiNi_{0.6}Mn_{0.2}Co_{0.2}O_2$ as a positive electrode active material, carbon black as a conductive material, PVdF (trade name: KF9700, manufacturer: Kureha, weight average molecular weight: 880,000) as a binder for an electrode active material layer in a weight ratio of 97.3:1.5:1.2, and adding the mixture to an NMP solvent so that a solid content became 69 wt %.

A composition for forming an insulating layer was prepared by dissolving 12 parts by weight of PVdF (trade name: KF9700, manufacturer: Kureha, weight average molecular weight: 280,000) as a binder for an insulating layer and 0.1 part by weight of a benzylidene dye, Yellow 81 (manufactured by BASF), as an organic dye in 100 parts by weight of NMP. Here, the viscosity of the composition for forming an insulating layer was 670 cP.

A positive electrode for a lithium secondary battery (size: 132 mm×104 mm) was prepared in the same manner as described in Example 1, except that the positive electrode active material slurry composition and the composition for forming an insulating layer, which were prepared above, were used.

In the positive electrode for a lithium secondary battery of Comparative Example 1, the thickness of the positive electrode active material layer was 80 μm and the thickness of the insulating layer was 1 μm in a region in which the positive electrode active material layer did not overlap the insulating layer, the length of the overlapping region was 0.5 mm. However, in a region in which the positive electrode active material layer and insulating layer overlap, erosion occurred, and it was impossible to measure A and $A_0$.

In Comparative Example 1, a ratio ($d_2/d_1$) of the thickness of the insulating layer in the region in which the electrode active material layer and insulating layer do not overlap ($d_2$) to the thickness of the electrode active material layer in the region in which the electrode active material layer did no overlap the insulating layer ($d_1$) was about 0.013.

Comparative Example 2

Preparation of Positive Electrode for Lithium Secondary Battery

The positive electrode active material slurry composition prepared in Example 1 was applied on an aluminum current collector, and dried at 160° C. for 3 minutes, thereby forming a dried positive electrode active material layer.

A positive electrode for a lithium secondary battery of Comparative Example 2 (size: 132 mm×104 mm) was prepared by forming a dried insulating layer by applying the composition for forming an insulating layer prepared in Example 1 on the aluminum current collector so as to overlap the dried positive electrode active material layer in a partial region, and drying the composition at 160° C. for 3 minutes.

The thickness of the positive electrode active material layer was 80 μm and the thickness of the insulating layer was 35.2 μm in the region in which the positive electrode active material layer did not overlap the insulating layer, the length of the overlapping region was 0.5 mm, A was 9.2 μm, and $A_0$ was 53 μm.

In Comparative Example 2, a ratio ($d_2/d_1$) of the thickness of the insulating layer in the region in which the electrode active material layer and insulating layer do not overlap ($d_2$) to the thickness of the electrode active material layer in the region in which the electrode active material layer did no overlap the insulating layer ($d_1$) was 0.44, and in a region in which the electrode active material layer and insulating layer overlap, $A/A_0$ was about 0.17.

Experimental Example 1

Evaluation by Scanning Electron Microscopy (SEM)

The cross-section of the overlapping region in the cross-section of each of the positive electrodes prepared by Examples 1 and 2 and Comparative Examples 1 and 2 was observed using a scanning electron microscope, and the results are shown in FIGS. 1 to 4 in the written order.

Figure 2:
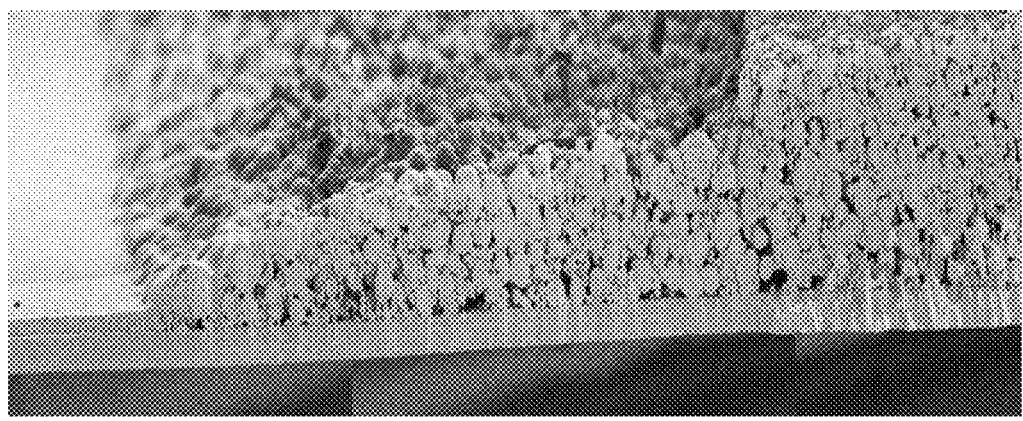
FIG. 2 is an SEM image showing the overlapping region of an insulating layer and a positive electrode active material layer in the cross-section of a positive electrode prepared in Example 2.

Referring to FIGS. 1 and 2, it can be confirmed that, in the positive electrodes of Example 1 and Example 2, the overlapping region of the insulating layer and the electrode active material layer was formed by an excellent cohesive strength, and erosion did not occur.

Figure 3:
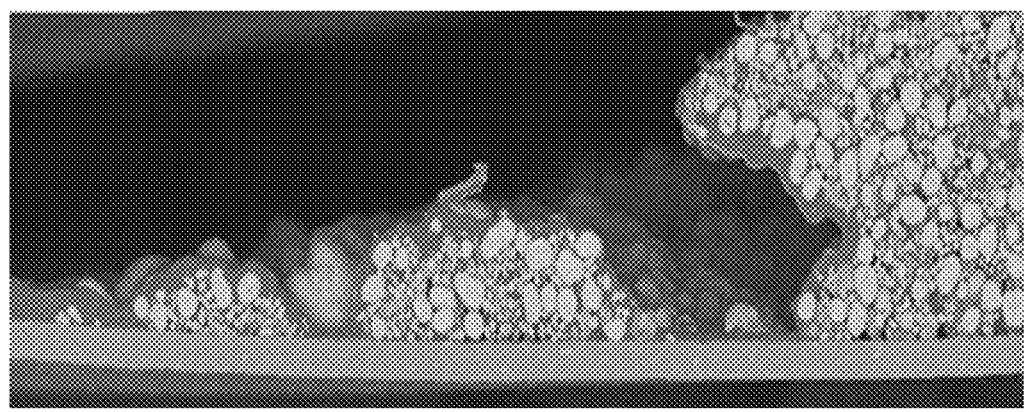
FIG. 3 is an SEM image showing the overlapping region of an insulating layer and a positive electrode active material layer in the cross-section of a positive electrode prepared in Comparative Example 1.

However, referring to FIG. 3, it can be confirmed that the positive electrode of Comparative Example 1 is not suitable for application to a product because a defective product was generated due to erosion occurring in the overlapping region of the insulating layer and the electrode active material layer, and insulation cannot be achieved sufficiently.

Figure 4:
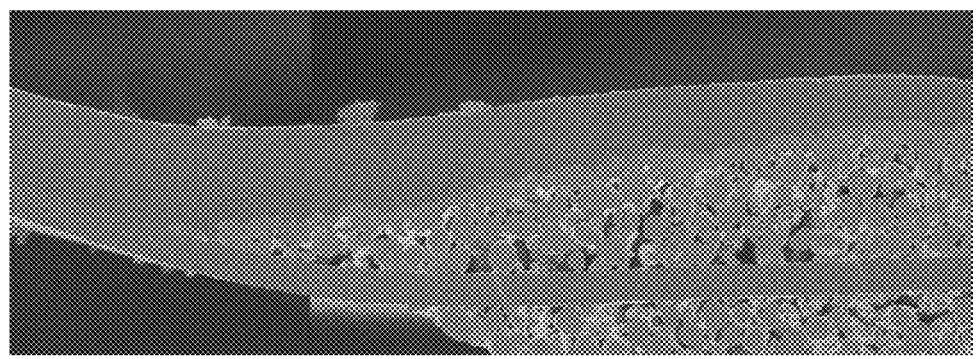
FIG. 4 is an SEM image showing the overlapping region of an insulating layer and a positive electrode active material layer in the cross-section of a positive electrode prepared in Comparative Example 2.

In addition, referring to FIG. 4, the positive electrode of Comparative Example 2 did not have erosion, but the insulating layer was formed thicker than the electrode active material layer by a dry coating method, this may cause a reduction in capacity according to an increase in thickness of the insulating layer as to be described below. Moreover, the positive electrode of Comparative Example 2 was formed such that the height of the end of the insulating layer was higher than the thickness of the electrode active material layer. However, when the above-described positive electrode is applied to a roll-to-roll process, there is a high risk of a defective electrode roll due to lifting at the end of the electrode, which is undesirable because it increases the possibility of a defective product.

Experimental Example 2

Evaluation of Capacity Characteristic

<Production of Secondary Battery>

A negative electrode active material slurry composition was prepared by mixing graphite (average particle size ($D_{50}$): 13 μm) as a negative electrode active material, acetylene black as a conductive material, styrene butadiene rubber (SBR) as a binder, and carboxymethylcellulose (CMC) as a thickening agent in deionized water in a weight ratio of 96:1:2:1. A negative electrode was prepared by applying the negative electrode active material slurry composition on one surface of a copper current collector layer (thickness: 6 μm), drying the applied composition at 150° C., and performing rolling. The thickness of the negative electrode was 95.9 μm.

An electrode assembly was prepared by interposing a polypropylene separator (thickness: 15 μm) between each of the positive electrodes for a lithium secondary battery prepared in Examples 1 and 2 and Comparative Examples 1 and 2 and the negative electrode and disposed in a case, and then an electrolyte was injected into the case, thereby producing a lithium secondary battery. The electrolyte used herein was prepared by dissolving $LiPF_6$ in a solvent prepared by mixing ethylene carbonate (EC), dimethyl carbonate (DMC) and ethyl methyl carbonate (EMC) in a volume ratio of 30:40:30 to have a final $LiPF_6$ concentration of 1M.

<Evaluation of Capacity Characteristic>

The lithium secondary batteries produced in Examples 1 and 2 and Comparative Examples 1 and 2 were subjected to initial charging (0.3C CC/CV charge, 4.2V/0.05C cut) and initial discharging (0.3C CC discharge, 2.5V cut), and discharge capacities were evaluated. The results are shown in Table 1 below.

TABLE 1

|  | Example 1 | Example 2 | Comparative Example 1 | Comparative Example 2 |
|---|---|---|---|---|
| Discharge capacity (Ah) | 60.3 | 60.1 | 59.5 | 58.2 |

Referring to Table 1, it can be confirmed that the electrode for lithium secondary batteries prepared in Examples 1 and 2 and the lithium secondary batteries exhibited high discharge capacities since the insulating layer was formed with a suitable thickness, compared with the electrode active material layer.

However, when the electrode for a lithium secondary battery prepared in Comparative Example 1 was used, the battery capacity was decreased due to the erosion of the electrode active material layer. In addition, when the electrode for a lithium secondary battery prepared in Comparative Example 2 was used, it can be confirmed that, since the insulating layer was excessively thick, the electrode active material did not exhibit sufficient capacity, and the battery capacity was decreased.

The invention claimed is:

1. An electrode for a lithium secondary battery, the electrode comprising:
    an electrode current collector;
    an electrode active material layer formed on the electrode current collector; and
    an insulating layer formed on the electrode current collector and overlapping the electrode active material layer in a partial region,
    wherein a thickness of the electrode active material layer in a region in which the electrode active material layer and insulating layer do not overlap is $d_1$, a thickness of the insulating layer in a region in which the electrode active material layer and insulating layer do not overlap is $d_2$, and $d_2/d_1$ is 0.02 to 0.4,
    wherein, in the region in which the electrode active material layer and insulating layer do not overlap, the thickness $d_2$ of the insulating layer is 3 to 20 μm and the thickness $d_1$ of the electrode active material layer is 50 to 150 μm, and
    wherein, in the partial region in which the electrode active material layer and the insulating layer overlap, the thickness of the insulating layer is continually decreased toward the electrode active material layer, and the thickness of the insulating layer at an end of the electrode active material layer is $A_0$, the thickness of the insulating layer at an end of the insulating layer is A, $A/A_0$ is 0.1 to 0.7, $A_0$ is 3 to 20 μm, and A is at least 0.15 and less than 20 μm.

2. The electrode according to claim 1, wherein a length of a region in which the electrode active material layer and the insulating layer overlap is 0.1 to 1.3 mm.

3. The electrode according to claim 1, wherein, in the region in which the electrode active material layer and the insulating layer overlap, the electrode active material layer is formed obliquely.

4. A method of preparing the electrode for a lithium secondary battery of claim 1, the method comprising:
    forming an undried electrode active material layer by applying an active material slurry composition on an electrode current collector;
    forming an undried insulating layer by applying a composition for forming an insulating layer so as to overlap the undried electrode active material layer in a partial region; and
    simultaneously drying the undried electrode active material layer and the undried insulating layer,
    wherein a difference in viscosity between the active material slurry composition and the composition for forming an insulating layer is 5,000 cP or less at 25° C., a viscosity of the composition for forming the insulating layer is 1,000 to 10,000 cP at 25° C., and a viscosity of the active material slurry composition is 5,000 to 15,000 cP at 25° C.

5. The method according to claim 4, wherein the composition for forming an insulating layer comprises a binder and a solvent, and
a solid content of the composition for forming an insulating layer is 5 to 15 wt %.

6. A lithium secondary battery comprising the electrode for a lithium secondary battery of claim 1.

7. An electrode for a lithium secondary battery, the electrode comprising:
an electrode current collector;
an electrode active material layer formed on the electrode current collector; and
an insulating layer formed on the electrode current collector and overlapping the electrode active material layer in a partial region,
wherein a thickness of the electrode active material layer in a region in which the electrode active material layer and insulating layer do not overlap is $d_1$, a thickness of the insulating layer in a region in which the electrode active material layer and insulating layer do not overlap is $d_2$, and $d_2/d_1$ is 0.02 to 0.4,
wherein, in the region in which the electrode active material layer and insulating layer do not overlap, the thickness $d_2$ of the insulating layer is 3 to 20 μm and the thickness $d_1$ of the electrode active material layer is 50 to 150 μm, and
wherein the thickness of the insulating layer at an end of the electrode active material layer is $A_0$, the thickness of the insulating layer at an end of the insulating layer is A, $A/A_0$ is 0.1 to 0.7, $A_0$ is 3 to 20 μm, and A is at least 0.15 and less than 20 μm.

8. An electrode for a lithium secondary battery, the electrode comprising:
an electrode current collector;
an electrode active material layer formed on the electrode current collector; and
an insulating layer formed on the electrode current collector and overlapping the electrode active material layer in a partial region,
wherein a thickness of the electrode active material layer in a region in which the electrode active material layer and insulating layer do not overlap is $d_1$, a thickness of the insulating layer in a region in which the electrode active material layer and insulating layer do not overlap is $d_2$, and $d_2/d_1$ is 0.02 to 0.4,
wherein, in the region in which the electrode active material layer and insulating layer do not overlap, the thickness $d_2$ of the insulating layer is 3 to 20 μm and the thickness $d_1$ of the electrode active material layer is 50 to 150 μm, and
wherein, in the partial region in which the electrode active material layer and the insulating layer overlap, the thickness of the insulating layer is decreased toward the electrode active material layer, and the thickness of the insulating layer at an end of the electrode active material layer is $A_0$, the thickness of the insulating layer at an end of the insulating layer is A, $A/A_0$ is 0.1 to 0.7, $A_0$ is 3 to 20 μm, and A is at least 0.15 and less than 20 μm.

* * * * *